(12) United States Patent
Brunswig et al.

(10) Patent No.: US 7,676,816 B2
(45) Date of Patent: Mar. 9, 2010

(54) SYSTEMS AND METHODS FOR INTEGRATING SERVICES

(75) Inventors: Frank Brunswig, Heidelberg (DE); Martin Hartig, Speyer (DE); Rau Stefan, Dielheim (DE)

(73) Assignee: SAP AG, Walldorf (DE)

( * ) Notice: Subject to any disclaimer, the term of this patent is extended or adjusted under 35 U.S.C. 154(b) by 111 days.

(21) Appl. No.: 11/477,573

(22) Filed: Jun. 30, 2006

(65) Prior Publication Data

US 2008/0004887 A1 Jan. 3, 2008

(51) Int. Cl.
  *G06F 3/00* (2006.01)
  *G06F 13/00* (2006.01)
  *G06F 15/16* (2006.01)
(52) U.S. Cl. .................. 719/330; 719/320; 709/201
(58) Field of Classification Search .......... 719/320, 719/330; 705/1, 26, 28; 709/201
  See application file for complete search history.

(56) References Cited

U.S. PATENT DOCUMENTS

| | | | |
|---|---|---|---|
| 6,199,081 B1* | 3/2001 | Meyerzon et al. | 715/210 |
| 6,782,531 B2* | 8/2004 | Young | 717/130 |
| 6,842,856 B2* | 1/2005 | Shenassa et al. | 713/1 |
| 7,254,814 B1* | 8/2007 | Cormier et al. | 718/106 |
| 2002/0112058 A1* | 8/2002 | Weisman et al. | 709/227 |
| 2003/0093572 A1* | 5/2003 | Laux et al. | 709/250 |
| 2003/0163513 A1* | 8/2003 | Schaeck et al. | 709/201 |
| 2004/0068586 A1* | 4/2004 | Xie et al. | 709/246 |
| 2004/0148185 A1* | 7/2004 | Sadiq | 705/1 |
| 2004/0205772 A1* | 10/2004 | Uszok et al. | 719/317 |
| 2005/0135264 A1* | 6/2005 | Popoff et al. | 370/252 |
| 2006/0123431 A1* | 6/2006 | Schepers et al. | 719/320 |
| 2007/0204273 A1* | 8/2007 | Chen et al. | 719/313 |
| 2007/0239730 A1* | 10/2007 | Vigelette et al. | 707/10 |

FOREIGN PATENT DOCUMENTS

WO WO0077653 12/2000

* cited by examiner

*Primary Examiner*—Hyung S Sough
*Assistant Examiner*—Qing-Yuan Wu
(74) *Attorney, Agent, or Firm*—Mintz, Levin, Cohn, Ferris, Glovsky and Popeo, P.C.

(57) ABSTRACT

Methods and apparatus, including computer program products, are provided for executing a service using a set of software plug-ins. The method may include generating, at a first computer, a service request to execute the service. The method may also include processing, at a second computer, the generated service request using the set of software plug-ins associated with the service to create a modified service request by executing each of the software plug-ins in a sequence. Further, the method may include executing, at a third computer, the service using the modified service request and processing, by a second set of software plug-ins based on the sequence, a result from the executing step.

18 Claims, 6 Drawing Sheets

| Parameter | Description |
| --- | --- |
| PLUG IN NAME Unique | Name of a plug-in. |
| PLUG IN CLASS | Name or the implementation class of the plug-in |
| BO NAME | Name of a technical BO that is defined for this plug-in. |
| PRIORITY | Number of a plug-in in a sequence<br>0..10: reserved for ESF plug-ins<br>11..89: user plug-ins<br>90..00: reserved for ESF plug-ins |
| SCOPE | Calling scope of a plug-in:<br>1. plug-in is active only on transactional calls of the framework-<br>2. plug-in is active on all stack levels |
| IS SYSTEM PI | True - the plug in is called every time for every user. Only the user specific setting "IS_ACTIVE" = false can overwrite this for non-ESF plug ins. For ESF plug ins a user specific deactivation is not possible.<br><br>False - the plug is in inactive. Only the user specific setting "IS_ACTIVE" = 'true' can overwrite this all plug ins. |

| Parameter | Description |
| --- | --- |
| IN BO NAME | BO name. |
| IN BO NODE NAME | BO node name. |
| IN ASSOCIATION NAME | Association to be followed. |
| IN NODE IDS | List of BO node NodeIDs. |
| IN FILL DATA | Indicator for filing table OUT DATA. |
| IN FILTER PARAMETERS | Filter data. |
| IN FILTERED ATTRIBUTES | List of active filter fields. |
| IN EDIT MODE | Indicates how the retrieved data is used. |
| IN REQUEST BEFORE IMAGE | Indicates whether data from the previous image is requested. |
| IN SORT OPTIONS | Table with sorting parameters [AttributeName, Ascending]. |

FIG. 4

| Parameter | Description |
| --- | --- |
| OUT FAILED NODE IDS | Subset of IN NODE IDS where no data is available. |
| OUT LINKS | The association result in form of a link table. |
| OUT DATA | Contain both NodeID and data parts. |
| OUT MESSAGES | Table with messages thrown for this call |
| OUT FAULT MESSAGES | Table with system messages thrown for this call. |

FIG. 5

SYSTEMS AND METHODS FOR INTEGRATING SERVICES

TECHNICAL INVENTION

The present invention generally relates to software-based applications. More particularly, the invention relates to methods and systems for integrating software-based services into a system.

BACKGROUND INFORMATION

Business increasingly relies on software solutions to maintain all aspects of a business. Software developers may work on different teams to develop these software solutions by creating services that are designed to address specific business needs. For example, a first team of software developers may design a service to receive a purchase order for a product, a second team of software developers may design a service to update an inventory database to reflect the purchase of the product, and a third team of software developers may design a service to handle receipt of payment and shipping of the product.

Once the services are developed, they may be integrated into a single system. The services may be called by a client located at a front-end computer and executed by a server located at a back-end. The client may call a service interface, which may locate the service at the back-end, provide the service with the required parameters to execute its functionality, and return the results of executing the service to the client.

However, the service interface must have sufficient information about each service in order to invoke it, such as the required parameters for the service, location of the service at the server, and permissions of a client to execute the services. As a result, each time that a software developer creates a new service to integrate into the system, the service interface must be updated. This process of updating the service interface can be time consuming and lead to errors. For example, when a client generates a request to purchase a product, the service interface may erroneously request to ship the product before checking inventory to ensure that the product is available. Accordingly, a need exists for solutions that allow services to be integrated into a system and that allow services to be activated or deactivated at runtime.

SUMMARY

Embodiments of the invention relate to systems and methods, including computer program products, for allowing software applications to use the services of other software applications where, for example, the applications are separate or distinct from one another.

In accordance with one embodiment, a method for executing a service using a set of software plug-ins may include generating, at a first computer, a service request to execute the service. The method may also include processing, at a second computer, the generated service request using the set of software plug-ins associated with the service to create a modified service request by executing each of the software plug-ins in a sequence. Further, the method may include executing, at a third computer, the service using the modified service request and processing, by a second set of software plug-ins based on the sequence, a result from the executing step.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, show certain aspects of the present invention and, together with the description, help explain some of the principles associated with the invention. In the drawings.

FIG. 3 illustrates an exemplary table describing a plug-in, consistent with certain aspects related to the present invention;

FIG. 4 illustrates an exemplary table of an input interface for a service for retrieving data, consistent with certain aspects related to the present invention;

FIG. 5 illustrates an exemplary table of an output interface for a service for retrieving data, consistent with certain aspects related to the present invention.

DETAILED DESCRIPTION

Reference will now be made in detail to the exemplary embodiments of the invention, examples of which are illustrated in the accompanying drawings. Wherever possible, the same reference numbers will be used throughout the drawings to refer to the same or like parts.

Figure 1:
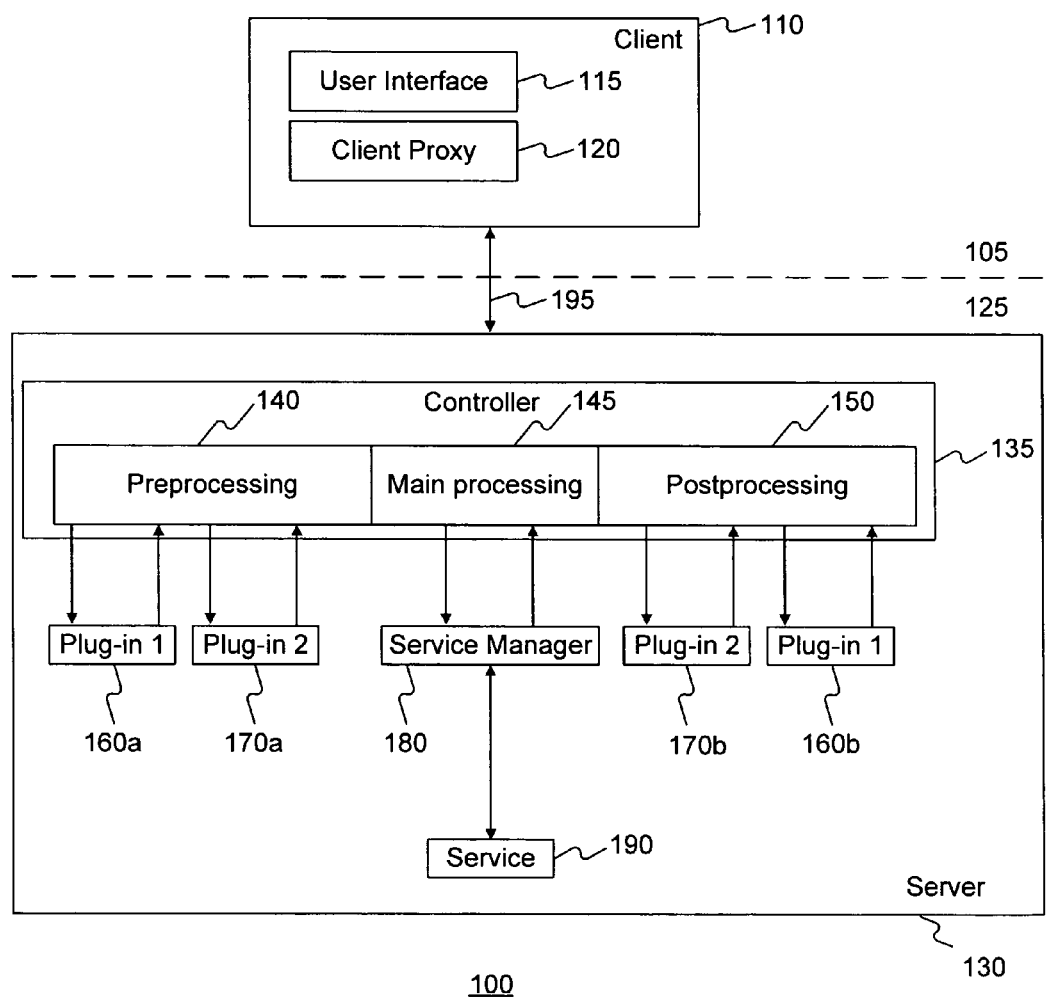
FIG. 1 illustrates a block diagram of exemplary system, consistent with certain aspects related to the present invention.

FIG. 1 illustrates a block diagram of exemplary system 100, consistent with certain aspects related to the present invention. System 100 may include a front-end 105 and a back-end 125. Front-end 105 may include a client 110 with a user interface 115 and a client proxy 120. Back-end 125 may include a server 130 and a controller 135 including a pre-processing module 140, a main processing module 145, and a post-processing module 150. Server 130 may include plug-ins 160*a*, 160*b*, 170*a*, and 170*b*, as well as a service manager 180 and a service 190.

Consistent with the invention, client 110 may generate a service request to execute a service, such as service 190. Plug-ins 160*a*-170*a* may process the service request to create a modified service request that can be used by service manager. Controller 135 may provide the resulting modified service request to service manager 180 to locate and execute service 190. A service request may be a request to execute a service that includes parameters that service manager 180 can use to locate and execute the service. A modified service request may be a service request that has been altered by plug-ins 160*a*-170*a* as described below. For example, plug-ins 160*a*-170*b* may record a service request and the results of executing the service request. In this manner, the creation and execution of service requests may be recorded for later analysis.

As another example, assume that a user creates a service request to retrieve a list of purchase orders received within a given time period for products A, B, and C. The service request may indicate the requesting client 110, identify the business object that is responsible for retrieving the list for products A, B, and C, and include parameters for the time period to retrieve the business records from (e.g., a start date and an end date). Further assume that client 110 is not authorized to retrieve purchase orders for product C. Plug-ins 160*a*-

170*a* may create a modified service request that does not include a request for product C. Server 130 may then execute service 190, and plug-ins 170*b*-160*b* may process the results of executing service 190. By utilizing plug-ins 160*a*-170*a* to process a service request and generate a modified service request, modifications to service manager 180 may be reduced when a new service is added or removed to server 130.

User interface 115 may allow a user to interact with system 100 and request that server 130 execute services. For example, user interface 115 may allow a user to request a record of all purchase orders that were generated in the last month. Additional exemplary services will be described below.

Client proxy 120 may generate requests to execute a service and provide the request to server 130. The request may be formatted according to the requirements of a service manager 180 (e.g., a table with a listing of parameters that are required to execute functions of a service, such as service 190). An example of input parameters for a service request will be provided with reference to FIG. 4 below.

Although illustrated as a single client 110 and client proxy 120, system 100 may include a plurality of clients which may be connected via network connections. Network connection 195 may include, alone or in any suitable combination, a telephony-based network, a local area network (LAN), a wide area network (WAN), a dedicated intranet, wireless LAN, the Internet, a wireless network, a bus, or any other any communication mechanisms. Further, any suitable combination of wired and/or wireless components and systems may be used to provide network connection 195 using bidirectional or unidirectional communication links, and/or direct links. In addition, client 110 may be included within back-end 125. Because client 110 may be distributed throughout system 100, client proxy 120 may be a generic client proxy, a local client proxy, or a remote client proxy. Moreover, a combination of these client proxies may be included within system 100 depending on the system architecture.

Server 130 may receive service requests to execute a service from client proxy 120. The service requests may be received by controller 135, which may use pre-processing module 140 and plug-ins 160*a* and 170*a* to create a modified service request, as described in detail below. A plug-in may be a software program that enhances the functionality of another software program. For example, plug-ins may be used to allow software programs to utilize different network protocols, such as HyperText Transfer Protocol. Plug-ins 160*a*-170*b* may be initialized and installed on server 130 and may be specific to a business object or a service located on server 130. A business object may be a service that performs a business process, such as a service that completes a purchase order. An "object" may refer to a software bundle of variables (e.g., data) and related methods. For example, in object-oriented programming, an object may be a concrete realization (instance) of a class that consists of data and the operations associated with that data.

Each plug-in 160*a*-170*b* may use the same interface as the interface used by service manager 180, such that client proxy 120 is not aware that controller 135 routes a service request through plug-ins 160*a*-170*a* prior to transmitting the resulting modified service request to service manager 180. Plug-ins 160*a*-170*b* may be developed according to the service for which the plug-in provides enhancing functionality. The interface for each service may include a list of input parameters and output parameters for use by controller 135, as described with reference to FIGS. 4 and 5 below.

Main processing 145 may receive the modified service request created by pre-processing module 140 and plug-ins 160*a*-170*a* and deliver the modified service request to service manager 180. Service manager 180 may then locate and execute the requested service 190 on server 130. For example, service manager 180 may locate the requested service 190 using the name of the service, which may be included in the service request. In another embodiment consistent with the invention, the service request may not include the name of the requested service. In this embodiment, service manager 190 may locate the requested service by identifying a set of services, such as all of the services that have been called since the last save or since client 110 generated the service request.

The results of executing the service may be returned to controller 135 for processing. Post-processing module 150 may use plug-in 170*b* and 160*b* to format the results for delivery to client proxy 120, as described in more detail below.

Although illustrated as including a single server 130, system 100 may include a plurality of servers 130 that may be connected with network connections 195. In addition, controller 135, plug-ins 160*a*, 160*b*, 170*a*, and 170*b*, service manager 180, and service 190 may be implemented on one or more servers 130.

Figure 2:
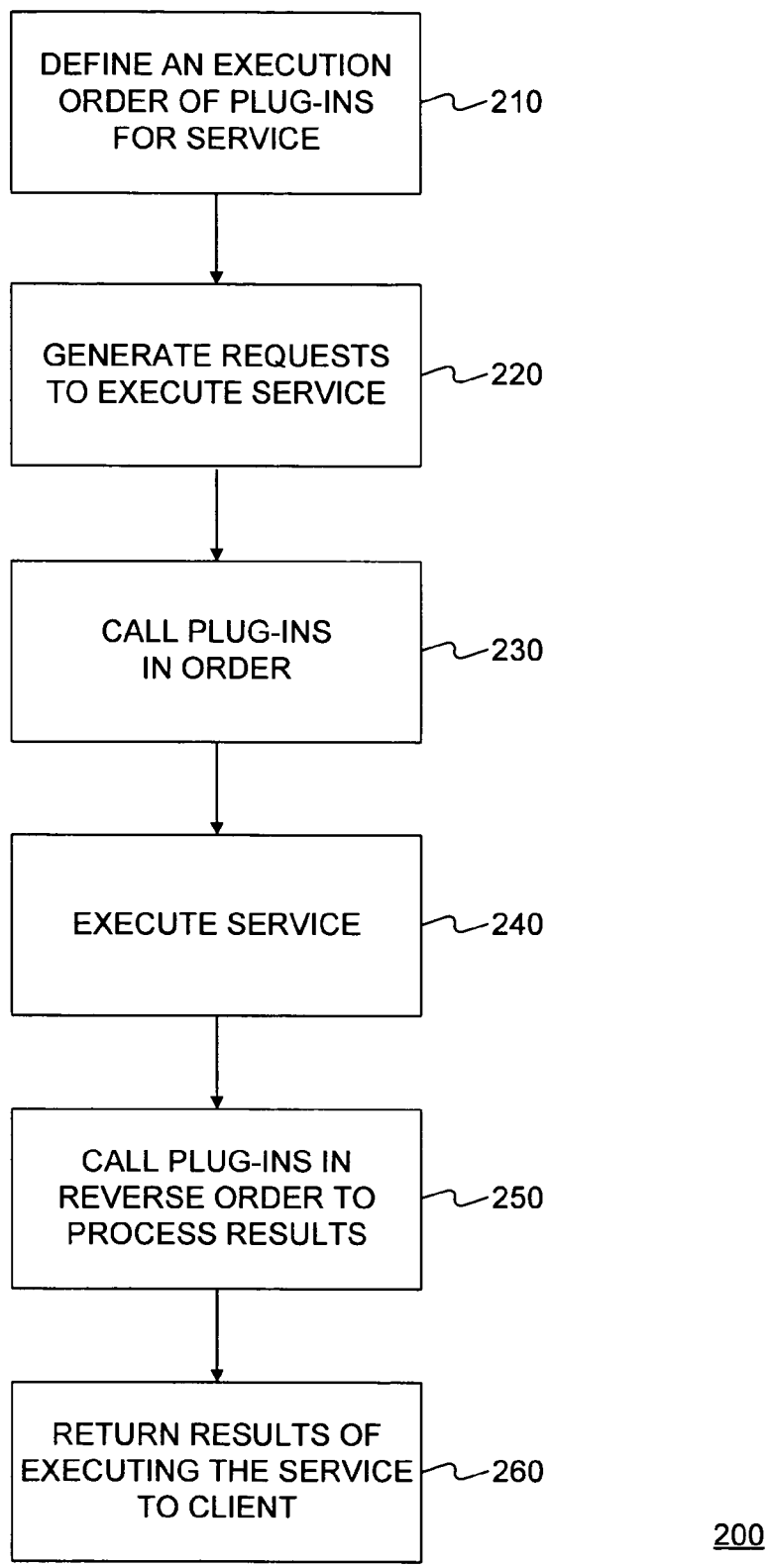
FIG. 2 illustrates a flowchart of an exemplary method, consistent with certain aspects related to the present invention.

FIG. 2 illustrates a flowchart 200 of an exemplary method, consistent with certain aspects related to the present invention. Reference will be made to items illustrated in FIG. 1 when describing the exemplary method.

At step 210, the execution order of plug-ins may be defined for a service using a sequencing parameter for each plug-in. For example, plug-in 160*a* may include a sequencing parameter having a number 1 to indicate that plug-in 160*a* is the first plug-in to execute. The sequencing parameter for plug-in 170*a* may be the number 2 to identify the second plug-in in the execution order, and so on. The execution order may be in a sequence that may be predetermined and may be modified at run-time, such as by skipping execution of a plug-in or conditionally executing a plug-in, as described below.

At step 220, client proxy 120 may generate a service request to execute a service. The service request may include parameters that identify the business object which is responsible for the service, as well as a table with all relevant input parameters for the business object. Returning to the example above, assume that a user creates a service request to retrieve a list of purchase orders received within a given time period for products A, B, and C. The service request may indicate the requesting client 110, identify the business object that is responsible for retrieving the list for products A, B, and C, and include parameters for the time period to retrieve the business records from (e.g., a start date and an end date). A detailed example of input parameters for a service request will be provided with reference to FIG. 4 below. Although the above describes client proxy 120 as generating service requests, in some implementations, user interface 115 generates the service request.

At step 230, controller 135 may receive the service request and parameters and call the plug-ins for the service to be executed in the order defined in step 210. The plug-ins may utilize generic input and output parameters, such as an input request parameter and an output request parameter. These generic input and output parameters may receive different data structures from the service request because each service request use different input parameters, depending on the business object(s) that the service request identifies. Controller 135 may therefore map the incoming parameters received with the service request to the generic input and output parameters of the plug-ins. The plug-ins may modify the service request to create a modified service request that can be used by service manager 180 to locate and execute service 190.

To modify the service request to create a modified service request, controller 135 may call the first plug-in 160a, which may perform processing on the service request. The parameters required for plug-ins may be stored by controller 135 in a database. For the first plug-in 160a to be called, controller 135 may transmit to plug-in 160a the input parameters of the service request that client proxy 120 intended to provide to service manager 180. The first plug-in 160a may also receive an input list of output parameters that client proxy 120 expects to receive in response to the service request. The first plug-in 160a may perform processing of the service request and transmit the modified service request to plug-in 170a, and so on, until a service request can be provided to service manager 180. Each plug-in 160a-170a may also receive from controller 135 a parameter to indicate if the plug-in is activated or deactivated.

Assume that client 110 is only authorized to retrieve a subset of the requested purchase orders received during a time period, such as only for products A and B. Controller 135 may deliver the service request for purchase orders for products A, B, and C to plug-in 160a. Plug-in 160a may delete the request to retrieve purchase orders for product C since client 110 is not authorized to retrieve this information, creating a modified service request. The original service request may be saved, and the modified service request excluding product C may then be transmitted to plug-in 170a for further processing. Plug-in 170a may further process the modified service request, for example, by generating a message to log or send to user interface 115, such as "Client 110 is not authorized to retrieve purchase orders for product C."

Although illustrated as two plugs-160a and 170a, any number of plug-ins may be used to process a service request into a format that can be used by service manager 180 to request execution of service 190. Moreover, plug-ins may be skipped if their functionality is not necessary, or if the output from the previous plug-in is sufficient to generate a service request for service manager 180. Each plug-in may return a "skip" flag to indicate that subsequent plug-ins should be skipped. Returning to the example above, if client 110 was authorized to retrieve purchase order information for product C, then plug-in 160a may return a "skip" flag to skip the generation of the message by plug-in 170a indicating that client 110 lacks authorization.

After plug-in 170a processes the modified service request, the service, such as service 190, may be executed by server 130 (step 240). Plug-in 170a may return the modified service request to controller 135, which may use main processing 145 to call service manager 180 with the modified service request. Service manager 180 may locate and execute the service at server 130. The results of executing the service may be returned from service manager 180 to controller 135. For example, service manager 180 may retrieve the purchase order history for products A and B during the selected time period and return these results to controller 135.

At step 250, controller 135 may call post-processing plug-ins 170b-160b in the reverse order from the pre-processing plug-ins 160a-170a. With reference to FIG. 1, controller 135 may call plug-in 170b to process the results of executing the service. Plug-in 170b may then call plug-in 160b to perform further post-processing of the results. Continuing with the example above, client proxy 120 expected to receive a purchase order list for products A, B, and C. However, because client 110 was not authorized to retrieve a purchase order list for product C, plug-in 160a modified the service request to exclude product C. As a result, plug-in 160b may modify the output parameter list that service 190 returned to include a value for product C. For example, plug-in 160b may indicate that the results for product C are "unavailable." At step 260, controller 135 may return the results of executing the service to client 110, which may be displayed on user interface 115.

FIG. 3 illustrates an exemplary table 300 describing a plug-in 160, consistent with certain aspects related to the present invention. Table 300 may include a plurality of parameters 310 and corresponding descriptions 320 for those parameters.

Parameters 310 may include a plug-in name, the name of a plug in; a plug-in class, the class that implements the plug in; and a business object name, the name of the business object that executes the service corresponding to the plug in. Parameters 310 may also include a priority, which may indicate the position of a plug-in in the sequence defined in step 210. Ranges of priority, such as 0-10 and 90-99, may be reserved for Enterprise Services Framework (ESF) plug ins. Exemplary ESF plug-ins may allow, for example, authorization checks to determine if client 110 is authorized to execute a service request; session recording to record a transaction between client 110 and server 130; trace recording to record the steps of a service request that server 130 executes, including the parameters used to execute the service request; conformance testing to ensure that the input parameters from client 110 match the output parameters from controller 135 (e.g., when performing a check operation that the number of input parameters match the number of output parameters); and performance tracing. Plug-ins created by users may be also be assigned a range of priority, such as 11-89, and may allow, for example, archiving business objects and recording with testing tools, such as extended Computer Aided Test Tool (commercially available from SAP AG, Walldorf, Germany). Thus, a plug-in with a sequencing priority of 11 may be called before a plug-in with a sequencing priority of 12, and so on. This order of calling the plug ins may be adjustable by software developers and/or by client 110.

Parameters 310 may also include a scope of the plug-in, indicating when a plug-in is active. For example, a plug-in may be active only with specific types of service requests, such as transactional calls of the framework which may be used to save data upon a request by a user through user interface 115. Parameters 310 may further include IS_SYSTEM_PI, which may be used to indicate that the plug-in is a system plug-in and cannot be changed by a user. System plug-ins may be valid for every user.

FIG. 4 illustrates an exemplary table 400 of an input interface for an exemplary service 190 for retrieving data, consistent with certain aspects related to the present invention. Table 400 may be defined when developing service 190, so that client 110 may generate a service request with the required parameters to execute service 190 (FIG. 2, step 240). The table 400 may include a plurality of parameters 410 and corresponding descriptions 420. Parameters 410 may include IN BO NAME, which represents the business object name that is responsible for the service described by table 400. Parameters 410 may also include an IN BO NODE NAME, which represents the business object node name for the service; an IN ASSOCIATION NAME, which represents a relationship between business objects nodes (e.g., a pointer from one business object node to another); an IN NODE IDS, which represents a business object node NodeID. A NodeID is any type of identifier that can be used to locate a business object node. For example, a memory location may serve as NodeID. Parameters 410 may further include IN FILL DATA, which may be used to fill an output data table; IN FILTER PARAMETERS, which represents filtering data (e.g., a data structure where results may be filtered to only a certain product category or material); IN FILTERED ATTRIBUTES, which represents active filter fields (e.g., the product category or material in the data structure to filter); IN EDIT MODE, which represents how the retrieved data is used (e.g., retrieve only, retrieve and edit); IN REQUEST BEFORE IMAGE, which may be used to request data from a previous configuration of system 100; and IN SORT OPTIONS, which represents a table with sorting parameters, such as sorting based on attribute name or sorting in ascending order. Table 400 may also include a data type of each parameter, such as a string, integer value, etc.

FIG. 5 illustrates an exemplary table 500 of an output interface from a service 190 that retrieves data. The output interface may be generated by service 190 during execution, as the results of executing service 190, and returned to service manager 180. Table 500 may include parameters 410 and a description of the parameters 420. Output parameters for the service may include OUT FAILED NODE IDs, which represents a subset of IN NODE IDs where no data is available (e.g., every data set may have a NODE ID, but the data set may have been deleted by client 110 and therefore no data is available). Output parameters may also include OUT LINKS, which represents associated results in the form of a link table. Results of executing a modified service request may be spread out between multiple nodes, and a link table may identify the association between those nodes. For example, the results may include a purchase order header with multiple purchase order items. A link table may be used to locate every purchase order item that the purchase order header includes. Output parameters for the service may also include OUT DATA, which may contain both the NodeID and the complete return data set; OUT MESSAGES, which represents a table with messages thrown during the service request (e.g., success or error messages); and OUT FAULT MESSAGES, which represents a table with system error messages generated during execution of service 190 (e.g., database not found or execution timed out).

Figure 6:
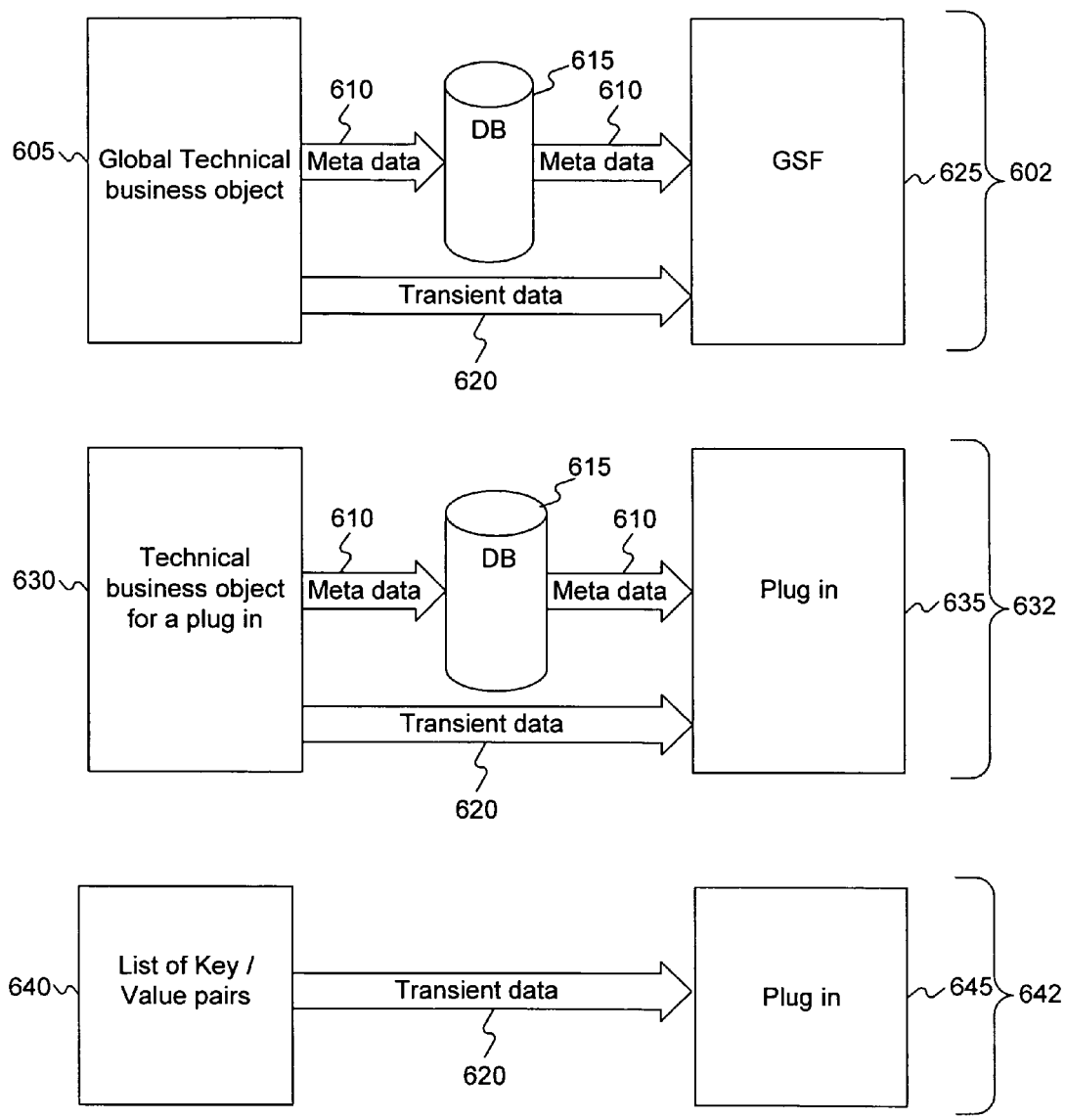
FIG. 6 illustrates an exemplary block diagram for maintaining the priority and order of plug-ins for services, consistent with certain aspects related to the present invention.

FIG. 6 illustrates an exemplary block diagram 600 for maintaining the priority and order of plug-ins for services, consistent with certain aspects related to the present invention. Plug-ins may be activated and deactivated, and the execution order of the activated plug-ins may be modified. Several exemplary techniques may be used to maintain the priority of executing plug-ins 160a-170a, as illustrated at 602, 632, and 642.

A first technique for maintaining the priority of plug-ins is to have a single, global technical business object 605, illustrated at 602. This business object may store a table including the sequencing priorities for all of the plug-ins and services in system 100. Metadata 610 may be data about data, which may include, for example, the input parameters of plug-ins and the execution order of the plug-ins. Metadata 610 data may be stored in a database 615. Authorized clients 110 may login through user interface 115 to system 100 through a framework, such as ESF or Generic Services Framework (GSF) 625, and update or modify the ordering of plug-ins.

A second technique for maintaining the priority of plug-ins is to have a technical business object 630 specific to each plug-in 635, illustrated at 632. Using this technique, each business object that implements a service may have a corresponding technical business object 630. A technical business object may be a business object that does not implement business functionality, but supports the implementation of business functionality. For example, the technical business object 630 may include a table with the order of plug-ins 160-170 for that service. The order and input parameters for plug-ins 160-170 may be stored as metadata 610 in database 615. Once a first plug-in 635 has executed, it may send a "start" message to the next plug-in listed in the table identified by the technical business object 630. Transient data 620 may be data that has a limited lifetime and may not be saved for reuse, such as data used to initiate a plug-in or stop a plug-in.

A third technique for maintaining the priority of plug-ins is to maintain the order actively at runtime. In this example, a listing of key value pairs 640 may be provided to controller 135 from client proxy 120 as part of a service request. The key value pairs may indicate the plug-ins 645 to use for executing the service. When controller 135 receives a service request from client proxy 120, plug-in 645 may determine if it is active, and if so, plug-in 645 may determine the order in which to execute from a message sent by controller 135. For example, controller 135 may send a "start" message as transient data 620 to plug-in 645 at the appropriate time for plug-in 645 to begin executing. In addition, client proxy 120 may indicate that plug-in 645 should "start" based on a command received from a user at user interface 115.

The services described herein are exemplary in nature. Additional exemplary services include storing data to server 130, validating information stored on server 130, modifying data stored on server 130, performing an action on data stored on server 130, executing a service's functionality, retrieving a list of parameters required to execute a service, performing a query on data stored on server 130, recording using extended computer-aided test tool (eCATT, commercially available from SAP AG, Walldorf, Germany), trace recording, conformance tests, business object archiving, and performance tracing. Each of these services may be integrating into system 100 using an input interface, an output interface, and plug-ins. Moreover, the input and output interfaces described herein are exemplary in nature, as additional or different parameters may be used to implement methods consistent with the invention.

The systems and methods disclosed herein may be embodied in various forms including, for example, a data processor, such as a computer that also includes a database, digital electronic circuitry, firmware, software, or in combinations of them. Moreover, the above-noted features and other aspects and principles of the present invention may be implemented in various environments.

Such environments and related applications may be specially constructed for performing the various processes and operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

The systems and methods disclosed herein may be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

It is to be understood that the foregoing description is intended to illustrate and not to limit the scope of the invention, which is defined by the scope of the appended claims. Other embodiments are within the scope of the following claims.

What is claimed is:

1. A computer-readable storage medium that stores a set of instructions which, when executed by a processor, perform a method comprising:

generating, by a proxy at a first computer, a service request to execute a service;

processing, at a second computer, the generated service request by calling and executing, in a first sequence, a set of two or more software plug-ins associated with the service to create a modified service request, each of the set of two or more software plug-ins in the first sequence comprising a sequencing parameter that defines when each of the set of two or more software plug-ins in the first sequence is called and executed, the service request including a first parameter to identify an object for the service and at least one second parameter serving as an input to the object, the at least one second parameter comprising one or more of the following: a name of the object, a node name of a node of the object, a filter parameter to filter a result, and a sort option, the set of two or more software plug-ins in the first sequence being configured specifically for the service, such that another service utilizes another, different set of software plug-ins, the set of two or more software plug-ins in the first sequence being configured to have an interface that is the same, from the perspective of the first computer, as the interface of a service manager that calls the service, each of the set of two or more plug-ins in the first sequence being deactivated or activated, respectively, depending on whether a skip flag is received at the service manager from a preceding software plug-in in the first sequence that subsequently creates the modified service request;

executing, at a third computer, the service using the modified service request to produce a result; and processing the result using the set of two or more software plug-ins called and executed in a second sequence that is a reverse of the first sequence.

2. The computer-readable medium of claim 1, wherein the method further comprises storing a table for input parameters of the service.

3. The computer-readable medium of claim 1, wherein the method further comprises storing a table for output parameters of the service.

4. The computer-readable medium of claim 1, wherein the method further comprises maintaining the first sequence for the software plug-ins using a service controller.

5. The computer-readable medium of claim 1, wherein processing the results of executing the service further comprises:

providing results of executing the service request for all of the parameters requested in the generated service request.

6. The computer-readable medium of claim 1, wherein the first sequence is predetermined before runtime.

7. A method for executing a service using a set of software plug-ins, comprising:

generating, by a proxy at a first computer, a service request to execute a service;

processing, at a second computer, the generated service request by calling and executing, in a first sequence, a set of two or more software plug-ins associated with the service to create a modified service request, each of the set of two or more software plug-ins in the first sequence comprising a sequencing parameter that defines when each of the set of two or more software plug-ins in the first sequence is called and executed, the service request including a first parameter to identify an object for the service and at least one second parameter serving as an input to the object, the at least one second parameter comprising one or more of the following: a name of the object, a node name of a node of the object, a filter parameter to filter a result, and a sort option, the set of two or more software plug-ins in the first sequence being configured specifically for the service, such that another service utilizes another, different set of software plug-ins, the set of two or more software plug-ins in the first sequence being configured to have an interface that is the same, from the perspective of the first computer, as the interface of a service manager that calls the service, each of the set of two or more plug-ins in the first sequence being deactivated or activated, respectively, depending on whether a skip flag is received at the service manager from a preceding software plug-in in the first sequence that subsequently creates the modified service request;

executing, at a third computer, the service using the modified service request to produce a result; and processing the result using the set of two or more software plug-ins called and executed in a second sequence that is a reverse of the first sequence.

8. The method of claim 7, further comprising: storing a table for input parameters of the service.

9. The method of claim 7, further comprising: storing a table for output parameters of the service.

10. The method of claim 7, further comprising:

maintaining, by a service controller, the first sequence for the software plug-ins.

11. The method of claim 7, wherein processing the results of executing the service comprises:

providing results of executing the service request for all of the parameters requested in the generated service request.

12. The method of claim 7, further comprising: predefining the sequence before runtime.

13. The method of claim 7, further comprising:

mapping, by a controller implemented on the second computer, the first and the second parameters to a generic input parameter format that is readable by the two or mote software plug-ins; and transmitting the mapped first and second parameters to the service manager.

14. A system comprising:

a first processor that comprises a proxy that generates a service request to execute a service;

a second processor that processes the generated service request by calling and executing, in a first sequence, a set of two or more software plug-ins associated with the service to create a modified service requests, each of the set of two or more software plug-ins in the first sequence comprising a sequencing parameter that defines when each of the set of two or more software plug-ins in the first sequence is called and executed, the service request including a first parameter to identify an object for the service and at least one second parameter serving as an input to the object, the at least one second parameter comprising one or more of the following: a name of the object, a node name of a node of the object, a filter parameter to filter a result, and a sort option, the set of two or more software plug-ins in the first sequence being configured specifically for the service, such that another service utilizes another, different set of software plug-ins, the set of two or more software plug-ins in the first sequence being configured to have an interface that is the same, from the perspective of the first processor, as the interface of a service manager that calls the service, each of the set of two or more plug-ins in the first sequence being deactivated or activated, respectively, depending on whether a skip flag is received at the service manager from a preceding software plug-in in the first sequence that subsequently creates the modified service request;

a third processor that executes the service using the modified service request to produce a result, wherein one of the first, the second, and the third processors processes the result using the set of two or more software plug-ins called and executed in a second sequence that is a reverse of the first sequence.

15. The system of claim 14, further comprising:
means for storing a first table for input parameters of the service; and means for storing a second table for output parameters of the service.

16. The system of claim 14, further comprising:
a service controller that maintains the first sequence for the software plug-ins.

17. The system of claim 14, wherein processing the results of executing the service comprises:
means for providing results of executing the service request for all of the parameters requested in the generated service request.

18. The system of claim 14, wherein the first sequence is predetermined before runtime.

\* \* \* \* \*